United States Patent
Lyon

(10) Patent No.: US 8,533,430 B2
(45) Date of Patent: Sep. 10, 2013

(54) MEMORY HASHING FOR STRIDE ACCESS

(75) Inventor: Terry L. Lyon, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1926 days.

(21) Appl. No.: 11/106,006

(22) Filed: Apr. 14, 2005

(65) Prior Publication Data

US 2006/0236072 A1     Oct. 19, 2006

(51) Int. Cl.
  *G06F 12/00* (2006.01)
  *G06F 13/00* (2006.01)
  *G06F 13/28* (2006.01)
  *G06F 9/26* (2006.01)
  *G06F 9/34* (2006.01)

(52) U.S. Cl.
  USPC ............ 711/217; 711/154; 711/167; 711/213

(58) Field of Classification Search
  USPC .................................. 711/154, 167, 213, 217
  See application file for complete search history.

(56) References Cited

U.S. PATENT DOCUMENTS

| | | | |
|---|---|---|---|
| 4,918,600 A | | 4/1990 | Harper, III et al. |
| 6,493,814 B2 * | | 12/2002 | Fields et al. ................. 711/216 |
| 2002/0023204 A1 * | | 2/2002 | Barowski et al. ............. 712/239 |
| 2004/0093457 A1 * | | 5/2004 | Heap ................................ 711/5 |
| 2004/0123043 A1 * | | 6/2004 | Rotithor et al. ............... 711/137 |

OTHER PUBLICATIONS

Andrew S. Tanenbaum, Structured Computer Organization, 1984, Prentice Hall, pp. 10-12.*

* cited by examiner

*Primary Examiner* — Ryan Bertram
(74) *Attorney, Agent, or Firm* — Robert R. Williams

(57) ABSTRACT

An apparatus and method in a computer system allows a software application to specify an intended stride access when writing data elements into a memory. A memory control in the computer system writes data in a manner that provides improved access performance when accesses to the data elements are performed using the intended stride. The memory system uses a hashing mechanism that uses the intended stride to store the data elements in such a way that accessing the data elements at the intended stride will ensure that consecutive accesses are not to the same group or bank of memory. Sequential accesses of the data elements also are ensured not to be directed to the same group or bank of memory. The memory can be divided into memory portions; different memory portions of the computer storage can have different intended strides.

23 Claims, 15 Drawing Sheets

Fig. 4B — EXEMPLARY ADDRESS SHOWING BANK AND GROUP ID

Fig. 4C — STRIDED READS, STRIDE > $2^3$

STRIDE TRANSLATE WITH STRIDE = $2^{12}$

| RAW ADDRESS 15 14 13 12 | RAW ADDRESS 3 2 1 0 | STRIDED ADDRESS 15 14 13 12 | STRIDED ADDRESS 3 2 1 0 | |
|---|---|---|---|---|
| 0 0 0 0 | 0 0 0 0 | 0 0 0 0 | 0 0 0 0 | |
| 0 0 0 0 | 0 0 0 1 | 0 0 0 0 | 0 0 0 1 | |
| 0 0 0 0 | 0 0 1 0 | 0 0 0 0 | 0 0 1 0 | |
| 0 0 0 0 | 0 0 1 1 | 0 0 0 0 | 0 0 1 1 | FIRST $2^{12}$ WRITES |
| 0 0 0 0 | 0 1 0 0 | 0 0 0 0 | 0 1 0 0 | |
| 0 0 0 0 | 0 1 0 1 | 0 0 0 0 | 0 1 0 1 | |
| . . . . | . . . . | . . . . | . . . . | |
| 0 0 0 0 | 1 1 1 1 | 0 0 0 0 | 1 1 1 1 | |
| 0 0 0 1 | 0 0 0 0 | 0 0 0 1 | 0 0 0 1 | |
| 0 0 0 1 | 0 0 0 1 | 0 0 0 1 | 0 0 0 0 | |
| 0 0 0 1 | 0 0 1 0 | 0 0 0 1 | 0 0 1 1 | |
| 0 0 0 1 | 0 0 1 1 | 0 0 0 1 | 0 0 1 0 | SECOND $2^{12}$ WRITES |
| 0 0 0 1 | 0 1 0 0 | 0 0 0 1 | 0 1 0 1 | |
| 0 0 0 1 | 0 1 0 1 | 0 0 0 1 | 0 1 0 0 | |
| . . . . | . . . . | . . . . | . . . . | |
| 0 0 0 1 | 1 1 1 1 | 0 0 0 1 | 1 1 1 0 | |

Fig. 6B

| RAW ADDRESS 15 14 13 12 | RAW ADDRESS 3 2 1 0 | STRIDED ADDRESS 15 14 13 12 | STRIDED ADDRESS 3 2 1 0 | |
|---|---|---|---|---|
| 0 0 0 0 | 0 0 0 0 | 0 0 0 0 | 0 0 0 0 | |
| 0 0 0 1 | 0 0 0 0 | 0 0 0 1 | 0 0 0 1 | |
| 0 0 1 0 | 0 0 0 0 | 0 0 1 0 | 0 0 1 0 | |
| 0 0 1 1 | 0 0 0 0 | 0 0 1 1 | 0 0 1 1 | FIRST SWEEP |
| 0 1 0 0 | 0 0 0 0 | 0 1 0 0 | 0 1 0 0 | |
| 0 1 0 1 | 0 0 0 0 | 0 1 0 1 | 0 1 0 1 | |
| . . . . | . . . . | . . . . | . . . . | |
| 1 1 1 1 | 0 0 0 0 | 1 1 1 1 | 1 1 1 1 | |
| 0 0 0 0 | 0 0 0 1 | 0 0 0 0 | 0 0 0 1 | |
| 0 0 0 1 | 0 0 0 1 | 0 0 0 1 | 0 0 0 0 | |
| 0 0 1 0 | 0 0 0 1 | 0 0 1 0 | 0 0 1 1 | |
| 0 0 1 1 | 0 0 0 1 | 0 0 1 1 | 0 0 1 0 | SECOND SWEEP |
| 0 1 0 0 | 0 0 0 1 | 0 1 0 0 | 0 1 0 1 | |
| 0 1 0 1 | 0 0 0 1 | 0 1 0 1 | 0 1 0 0 | |
| . . . . | . . . . | . . . . | . . . . | |
| 1 1 1 1 | 0 0 0 1 | 1 1 1 1 | 1 1 1 0 | |

Fig. 6C

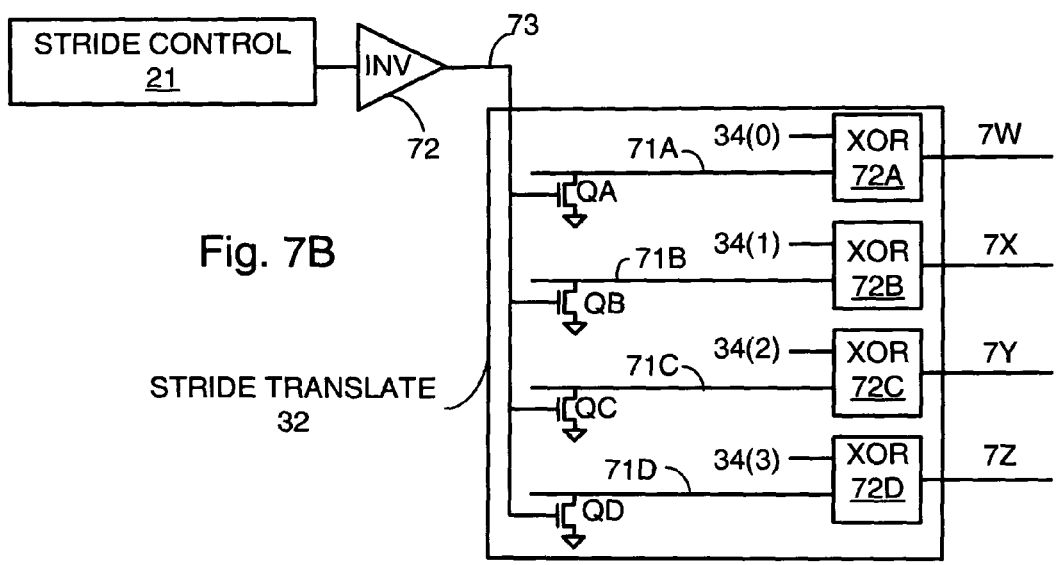
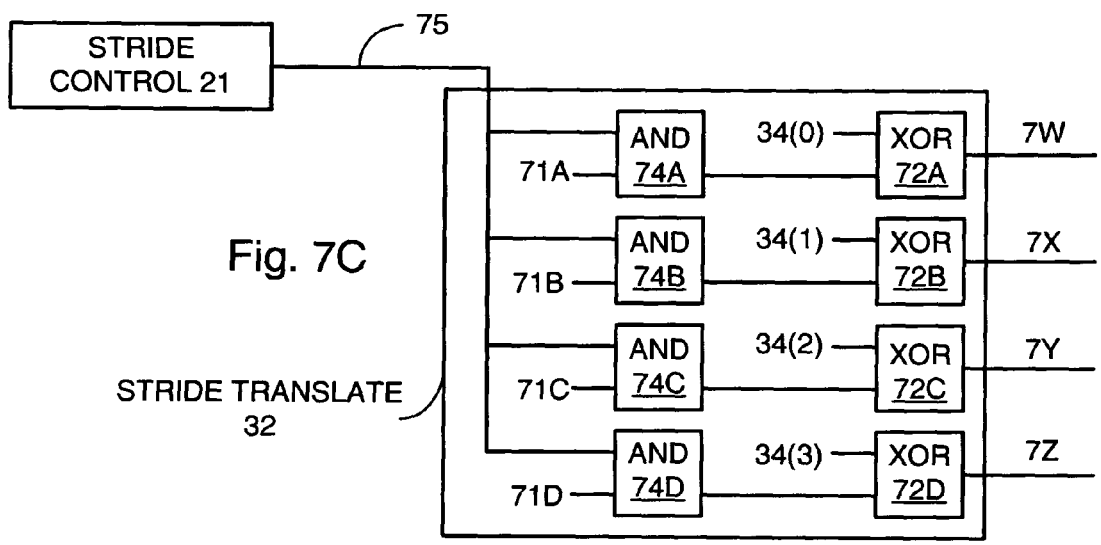

BANDWIDTH ASSUMING A 60 ns BANK REFRESH TIME. FOUR BANKS, FOUR GROUPS

| GROUP HASHING? | BANK HASHING? | DATA TRANSFER | STRIDING BANDWIDTH |
|---|---|---|---|
| NO | NO | 8B/60ns | 133 MB/sec |
| YES | NO | 4x8B/60ns | 533 MB/sec |
| NO | YES | 4x8B/60ns | 533 MB/sec |
| YES | YES | 4x4x8B/60ns | 2.133 GB/sec |

Fig. 8D

DATA WRITTEN WITH STRIDE BIT = 16

DATA WRITTEN WITH STRIDE BIT = 16
AND READ AT STRIDE = $2^{16}$

DATA WRITTEN WITH STRIDE BIT = 16
BUT READ AT STRIDE = $2^{15}$

MEMORY HASHING FOR STRIDE ACCESS

STATEMENT REGARDING FEDERALLY SPONSORED RESEARCH OR DEVELOPMENT

The invention was made with Government support under Contract No.: NNV8-881948. The Government has certain rights in this invention.

BACKGROUND OF THE INVENTION

1. Field of the Invention

The current invention generally relates to computer memory systems. More particularly, the current invention relates to computer memory systems where an application writes a block of data into memory in a first order and then reads the block of data in a second order.

2. Description of the Related Art

Computing system hardware and software designers are constantly addressing the problem of how to get data transferred between storage and a processor as quickly as possible. Processor speeds have dramatically increased over the years as processor technology has improved, leading to faster processor cycle times and increased processor densities. Although memory density has also dramatically improved, performance of memory technology has lagged behind the performance of the processor.

Use of caching techniques has greatly helped in matching processor performance to memory performance for many applications. Caching involves a hierarchy of memories that depend on a computer application's tendency to reuse data at a particular address, or data that is "near" the particular address. This is called "locality of reference". Typically, a very fast but relatively small first level cache is provided on the same chip that the processor is built. For example, a first level cache might be 64 KB (kilobytes) and provides data to the processor in one or two processor cycles. A first level cache is built using SRAM (static random access memory) in virtually all current designs. Many processors have two first level caches, one for instructions, and one for data. Second level caches are typically larger and slower than first level caches. In current technology, second level caches are also constructed on the same chip that the processor is constructed on. A second level cache is typically 128 KB to a megabyte (MB). Second level cache, like first level cache, is typically built using SRAM technology. Third level caches are larger and slower than second level caches, often using DRAM (dynamic random access memory) technology, although some current computer systems utilize SRAM for the third level cache.

Cache implementations read and write blocks of memory called cache lines. Cache lines typically contain from 32 bytes to 256 bytes. When the processor needs data at address "x", the first level cache is checked to see if it holds a cache line containing address "x". If so, the data at address "x" is read from the first level cache and is made available to the processor. If the first level cache does not hold the cache line containing address "x", (called a cache miss) the second level cache is checked. If the second level cache holds the cache line containing address "x", that cache line is read and typically moved to the first level cache, with the data at address "x" made available to the processor. Similarly, if a cache miss occurs in the second level cache, the cache hierarchy is further checked until the cache line containing the requested address is found, perhaps in main memory, and the cache line containing the requested address is then copied down the cache hierarchy. Cache hierarchies work well as long as data addressing patterns have a high degree of locality of reference. Locality of reference means that if a particular data element has been referenced, in many applications, it is likely to be referenced again in the near future. Also, if a particular data element has been referenced, it is likely, in many applications, that another data element having an address that is very close to the particular data element will be used in the near future.

Some applications do not have a high degree of locality of reference. For example, a particular scientific application reads data in a sequential manner. In the example, the data comprises a block of readings from a sensor, the block of data making up a mathematical matrix. Mathematical operations are subsequently performed on the data in the mathematical matrix, often not in the same order that the data was written into the mathematical matrix. To illustrate further, consider a two dimensional matrix, x(32,32), in the notation of the FORTRAN programming language. Data is written sequentially into the matrix (in Fortran) as x(1,1), x(2,1), x(3,1) . . . x(32,1), x(1,2), x(2,2), and so on. Many matrix operations will address elements in the matrix in a different order, such as making sequential reads to every $32^{nd}$ data element in the matrix in the example. Making such regular access to relatively widely separated data elements is called "striding". In the example, the "stride" is 32 data elements. (Note that in various computer systems a data element could be a byte, a 32-bit word, a 64-bit double word, or any other suitably defined piece of data used by the processor).

Striding in a computer system often makes a cache hierarchy counterproductive. For example, assuming the block of data (e.g., the matrix) is too big to be contained in a level of cache (in particular, the first level cache), entire cache lines must be moved into and later moved from the level of cache to satisfy a need for a small portion of the content of the cache lines. Suppose that a mathematical matrix operation needs an eight byte data element in a 128 byte cache line. Due to a long stride, the cache line will not be again accessed for some time. The entire 128 byte cache line is moved into the cache, the 8 byte data element is used, and the cache line is later replaced before any of the other 120 bytes are used. This operation results in sixteen times (i.e., 128/8) the traffic on a data bus supplying the cache data than is required.

Modern memories in computer systems are usually made up of groups and banks. A group comprises a plurality of banks. In modern DDR-2 DRAMs (dynamic random access memory) each DRAM module can have four banks of memory. In addition to making the cache hierarchy counterproductive, striding often causes sequential reads to a single group or even a single bank in a particular group. Banks within a group typically require a significantly long time interval between a first access and a following access. Typically there is a single data bus from a memory control unit to a particular group; therefore, repeatedly accessing the same group, and particularly the same bank within a group, can dramatically delay data needed by the processor.

Therefore, there is a need for a method and apparatus that provide for more efficient handling of striding requirements.

SUMMARY OF THE INVENTION

The current invention teaches methods and apparatus that provide for efficient accessing of data elements in a memory portion in a memory of a computer system when those data elements are accessed sequentially, or accessed at an intended stride. In many applications, especially those that perform matrix mathematical computations, data elements are written sequentially into the memory portion, but are later accessed at a stride, the stride being known to the application when the data elements are written sequentially. Alternatively an application may write data elements at an intended stride into the memory portion and later access the data elements sequentially. Computer memories are typically constructed of groups of memory, each group having a number of banks. A particular bank of memory, once accessed, cannot be accessed again for a significantly long time. Therefore, it is desirable to write data elements into memory in such a way that consecutive writes to memory do not go to the same bank in the same group. In addition, it is desirable that, when the data elements are accessed at the intended stride, the same bank in the same group is not consecutively accessed. Furthermore, it is desirable that, when data elements are accessed sequentially, the same bank in the same group is not consecutively accessed.

In an embodiment of the invention, an application running in a processor of a computer system provides a memory control with information about a memory portion prior to writing a number of data elements into the memory portion, including an intended stride. The memory control then writes the data elements into the memory distributed in such a way that the same bank in the same group is not written to repeatedly in a row, such as twice in a row; furthermore, the data elements are distributed in such a way that, when accessing them at the intended stride, the same bank in the same group is not consecutively accessed.

Data elements can be written sequentially, with knowledge of later intended stride access, with subsequent accesses of the data elements at either the intended stride or sequential accesses not consecutively going to the same bank in a particular group. Data elements can be written at the intended stride, with subsequent sequential access, or access at the intended stride not consecutively accessing the same bank in a particular group.

In an embodiment, a stride translate hashes one or more bits in a raw address, determined by the intended stride, with one or more bits that identify group and/or banks in the memory portion. The bits resulting from the hashing are used in a strided address that is physically used to address the memory as the group and/or bank identification bits, the remaining bits in the strided address are the corresponding bits in the raw address.

BRIEF DESCRIPTION OF THE DRAWINGS

FIG. 4B shows how the bank ID and group ID fields are used to address groups and banks of memory in a computer system.

FIG. 4C shows how addressing using a stride can cause the same group and the same bank to be accessed on sequential reads of memory.

FIG. 6B shows portions of sequentially writing two blocks of $2^{12}$ elements of data into a memory portion, using an intended read stride of $2^{12}$ as shown in FIG. 6A.

FIG. 6C shows portions of two read sweeps through a memory portion using the intended stride of $2^{12}$ as shown in FIG. 6A.

FIGS. 7B-7C each show further details of the stride translate of FIG. 7A that suppresses stride translation if a stride control is inactive.

FIG. 8D is a table showing how many bytes per second can be achieved using various combinations of group and bank hashing.

DETAILED DESCRIPTION OF THE PREFERRED EMBODIMENTS

The invention will be described in detail with reference to the figures. It will be appreciated that this description and these figures are for illustrative purposes only, and are not intended to limit the scope of the invention. In particular, various descriptions and illustrations of the applicability, use, and advantages of the invention are exemplary only, and do not define the scope of the invention. Accordingly, all questions of scope must be resolved only from claims set forth elsewhere in this disclosure.

The current invention teaches a method and apparatus to efficiently access a memory comprising one or more groups, each group having one or more banks. Bank and/or group hashing is performed based on a preferred stride to distribute data elements in the memory so that the data elements can be accessed (read or written) at optimal performance for both sequential and preferred stride operations. The memory can also be read at a stride unequal to the preferred stride, but at a degraded performance.

Figure 1:
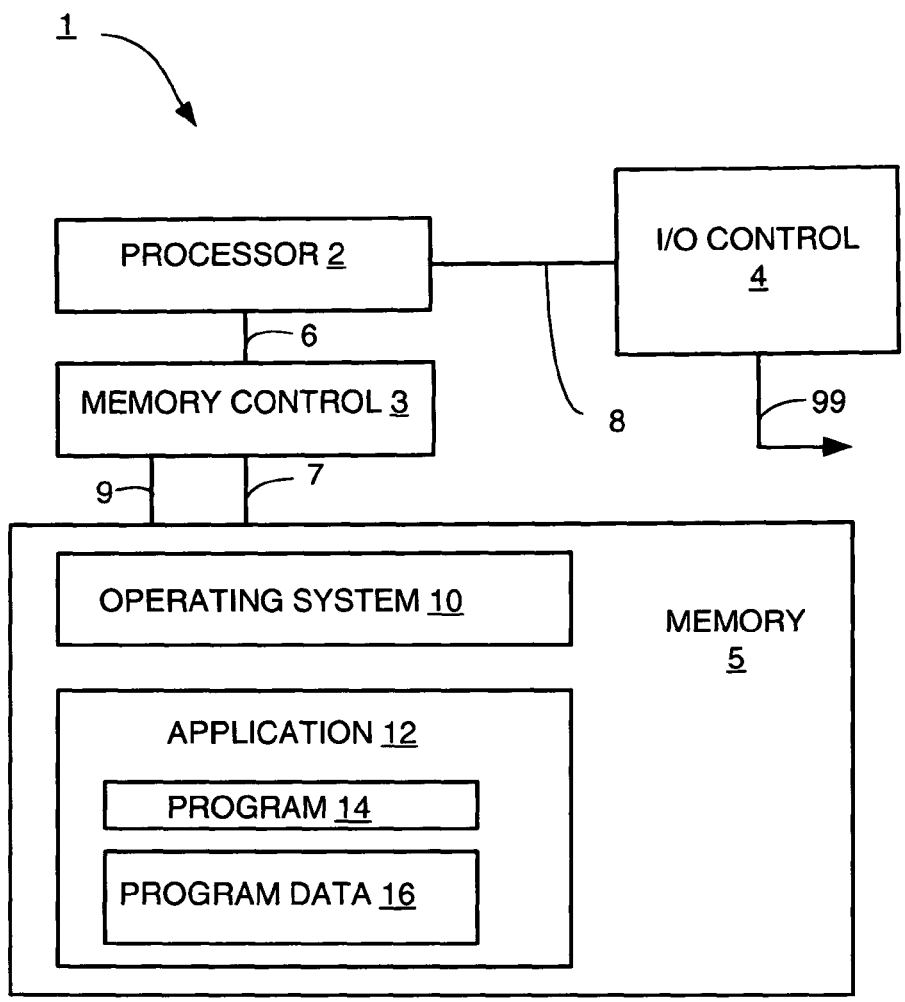
FIG. 1 is a block diagram of a computer system suitable for using embodiments of the present invention.

FIG. 1 illustrates a computer system 1 having various embodiments of the present invention. Computer system 1 has a processor 2 capable of executing computer readable instructions, that is, one or more programs. Processor 2 is coupled to a memory control 3 by way of processor bus 6. Processor bus 6 carries signals between processor 2 and memory control 3. Processor bus 6 typically comprises a plurality of signal conducting wires that can include unidirectional and bidirectional signaling capability. Processor 2 is also coupled to an I/O control 4 by way of bus 8. I/O control 4 controls, using bus 99, hard disks, CDROM drives, network adapters, magnetic tapes, and other input/output devices used with a particular computer system. Such individual I/O devices are not shown because they are well known and are not important to an understanding of the present invention. Although a single processor (processor 2) is shown for simplicity, the invention is not limited to a single processor.

Memory control 3 receives requests for data from processor 2 via processor bus 6. Memory control 3 is coupled to a memory 5 using memory address bus 7 and memory data bus 9. Memory 5 is comprised of industry standard DRAM (dynamic random access memory) elements, such as DDR-2 memory modules. A more detailed description of memory 5's physical makeup using groups and banks will be described later. Memory 5 contains one or more programs and data needed by the one or more programs. For example, memory 5 contains operating system 10. Memory 5 also contains an application 12 which further comprises an application program 14 having instructions executable on processor 2 and application program data 16 which is used by application program 14.

Memory control 3 sends one or more addresses to memory 5 using a memory address bus 7. Data is transferred over a memory data bus 9. It will be appreciated that in some computer systems, the same physical wires may be used, at different times, for different purposes (i.e., the wires are time multiplexed). Very high performance computer systems tend to have dedicated wires for data transmission and for address transmission in order to achieve as high a total bandwidth as possible.

Figure 2:
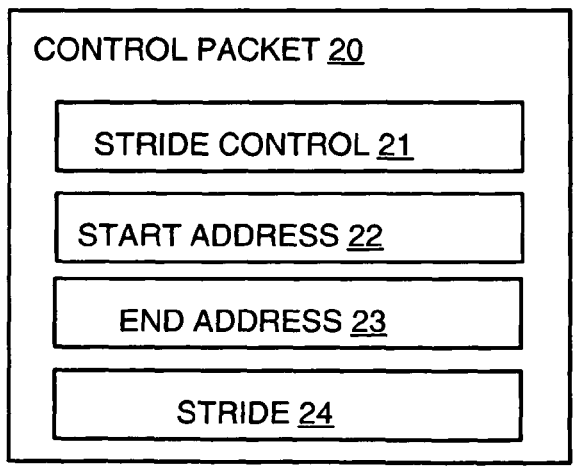
FIG. 2 shows a block diagram of a control packet sent from an application running in a processor in FIG. 1 to a memory control in FIG. 1.

FIG. 2 shows a control packet 20 that is transmitted from application 12 running in processor 2 to memory control 3 as a portion of a request to read data from or to write data to memory 5. Control packet 20 contains a stride control 21, a start address 22, an end address 23, and a stride 24. Stride control 21 identifies the nature of a request. Stride control 21, in various embodiments, includes information including one or more of the following information: write sequential with intent to read with stride; write with stride with intent to read sequential; read sequential; read with stride; and write sequential with no intent to stride. Start address 22 identifies a starting address of a memory portion, the data in the memory portion having an intended read stride. End address 23 identifies the ending address of the memory portion having an intended read stride. It will be appreciated that alternative methods to identify the memory portion would work as well, for example, a starting address and a memory portion length. Stride 24 contains the intended access stride. For example, if the memory portion will be read with a stride of $2^{12}$, stride 24 will so indicate.

Figure 3B:
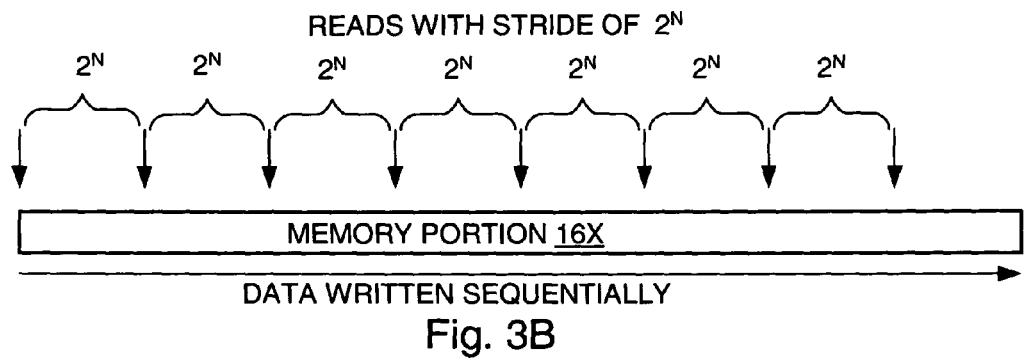
FIG. 3B shows a memory portion of a program data, written sequentially, with intent to read using a $2^N$ stride.
Figure 3A:
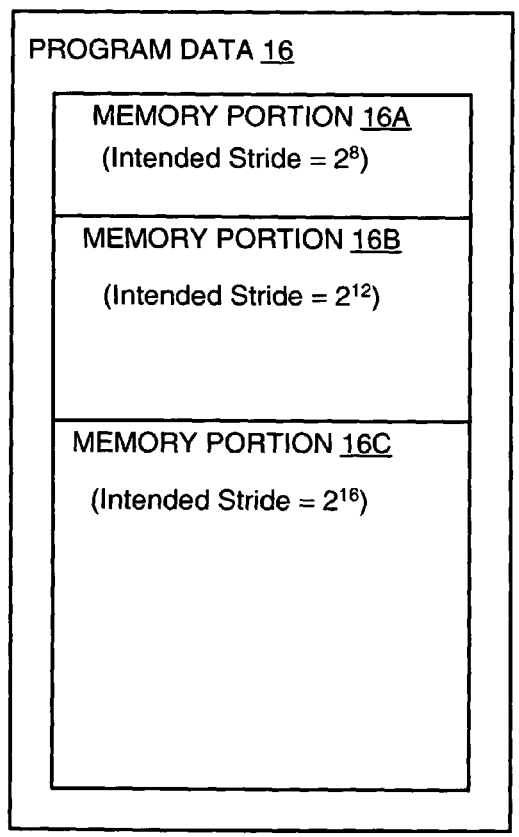
FIG. 3A is a block diagram of a program data, having three memory portions, each memory portion intended to be read using a stride determined for that memory portion.

FIG. 3A shows program data 16, with several exemplary memory portions, memory portion 16A, having an intended access stride of $2^8$, memory portion 16B, having an intended access stride of $2^{12}$, and memory portion 16C, having an intended access stride of $2^{16}$. Although the memory portions are shown, for simplicity, as contiguous, memory portions need not be contiguous.

FIG. 3B shows an exemplary memory portion 16X. Data is written sequentially into memory portion 16X, but is read (or, alternatively, again written) later with a stride of $2^N$. As explained earlier, many mathematical operations, such as matrix operations use data elements in the memory portion 16X at such strides. It will be appreciated that in some applications, data is written at the intended access stride and subsequently accessed sequentially.

Figure 4A:
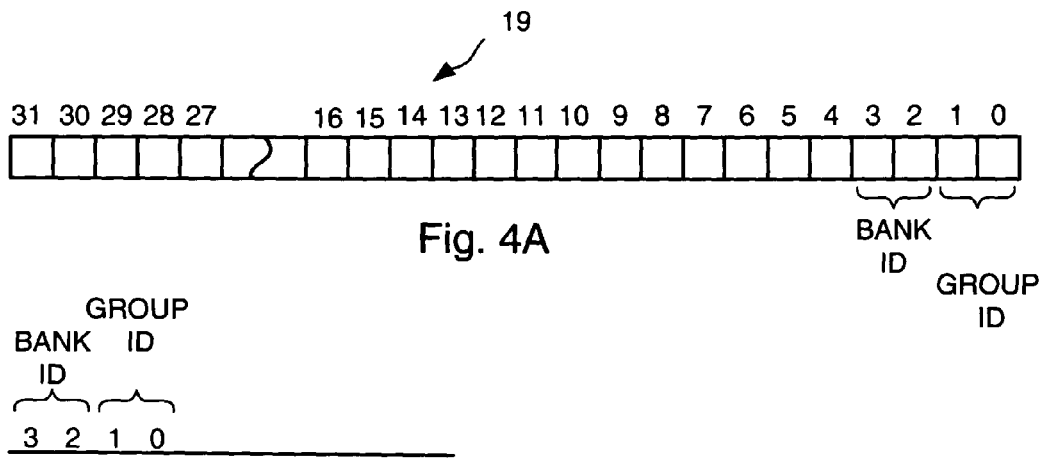
FIG. 4A shows an exemplary 32 bit address, containing a bank ID field and a group ID field.

FIGS. 4A-4C illustrate how, if group and/or bank hashing is not used, reading of data can make repeated access to the same bank in the same group. An address 19 is an exemplary 32 bit address used to address a memory. Bits 0, 1 of address 19 designate which of four groups the data is stored in. Bits 2, 3 of address 19 designate which of four banks in the selected group the data is stored in. FIG. 4B shows the group and bank for each combination of address bits 0-3. When data is written into memory sequentially, FIG. 4B also shows how data is dispersed into the memory. For example, a first element of data is stored in group 0, bank 0. A second element of data is stored in group 1, bank 0. A third element of data is stored in group 2, bank 0. Subsequent successive elements of data are distributed in the groups and banks of memory, as a value in address 19 is incremented, with the least significant bits changing fastest. FIG. 4C shows the bank and group IDs during an access, the access stride being greater than $2^3$. For example, suppose that the access stride were $2^{12}$. During a strided access (e.g., a read or a write), data elements are accessed by addressing every $2^{12th}$ data element. The value in address 19 "counts" with bit 12 toggling for each successive data element being accessed. Bits 0-3, the bank and group ID's, do not change, except once every sweep of the data portion. As shown in the example of FIG. 4C, group 0, bank 0 is accessed for every data element. Once a bank has been accessed, a significant time must be waited before the same bank can be accessed again, leading to very slow performance of the computer system 1 as processor 2 must continually wait for data from memory 3. It will be appreciated that writing at the stride of $2^{12}$, as well as reading at the stride of $2^{12}$ will have the same undesirable effect of consecutively accessing the same bank in the same group.

Figure 5:
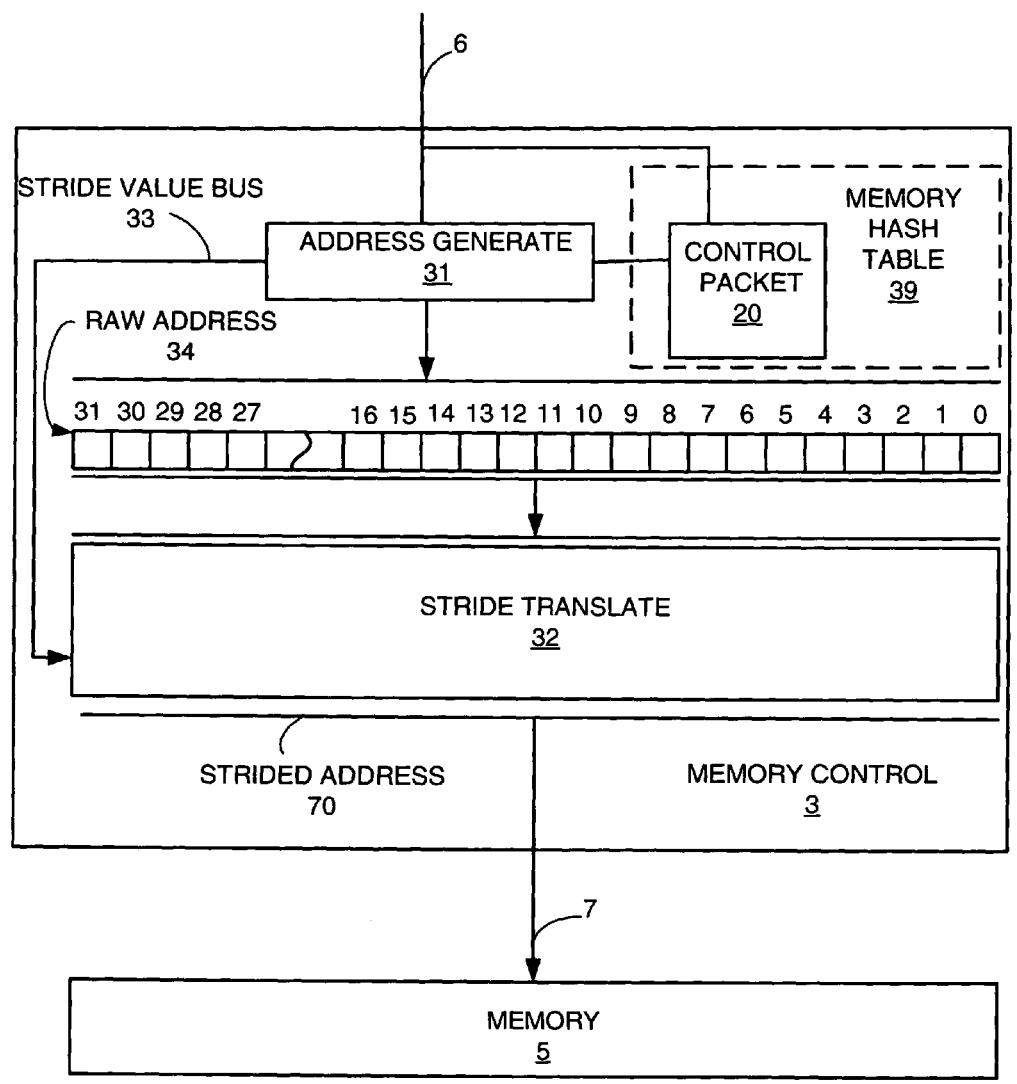
FIG. 5 shows a high level block diagram of a memory control capable of writing data into memory having knowledge of the intended stride, and efficiently reading the data at the intended stride.

FIG. 5 illustrates a high level block diagram showing memory control 3 providing a strided address 70 to memory 5 via address bus 7 that provides for efficient sequential or strided accesses. Memory control 3 receives a memory request from processor 2 via processor bus 6. In an exemplary embodiment, a control packet 20 is transmitted. As described earlier and referencing FIG. 2, control packet 20 contains a stride control 21, containing information as to whether a read with stride is intended with data in the present memory request. For example, if stride control 21 has a value of "0", no read stride is intended. Data can be simply written into memory conventionally, such as simply by incrementing the address for each data element written into memory 5. Start address 22 contains the starting address of a memory portion (e.g., memory portion 16A shown in FIG. 3A). End address 23 contains the address of an end of a memory portion (e.g., memory portion 16A shown in FIG. 3A). Stride 24 is the intended read stride. Information in control packet 20 comes from application program 14 (see FIG. 1). Application program 14 knows the size of the data (e.g., knows that it will be writing a matrix of a particular size) and knows that, based on a particular mathematical operation that application program 14 will be performing, what the intended access stride will be. For example, a 4096×4096 matrix of data elements may be written with successive data elements being written into successive columns of the matrix but later accessed with successive data element being read from (or written to) successive rows of the matrix.

In an embodiment, memory control 3 stores the information from control packet 20 in a memory hash table 39. In an alternative embodiment, control packet 20 is simply sent to memory control 3 when data is written to a particular memory portion (e.g., memory portion 16A, seen in FIG. 3A), and control packet 20 is sent again to memory control 3 when the particular memory portion is read.

Memory control 3 contains address generate 31 that produces raw address 34 and a stride value transmitted on stride value bus 33. Raw address 34 is the logical address that is presently being accessed (read or write) from memory 5. For example, in a sequential write, address generate 31 will simply produce a sequence of raw addresses 34 by incrementing from the start address of a particular memory portion to the end address of the particular memory portion. The stride value is taken from stride 24 in control packet 20, either from a control packet sent with a memory access request sent from processor 2, shown in FIG. 1, or stored in memory hash table 39 (explained later with reference to FIGS. 9A-9D), in embodiments implementing memory hash table 39.

Stride translate 32 receives raw address 34 and the stride value on stride value bus 33 and produces a strided address 70 which is transmitted to memory 5 over address bus 7.

Figure 6A:
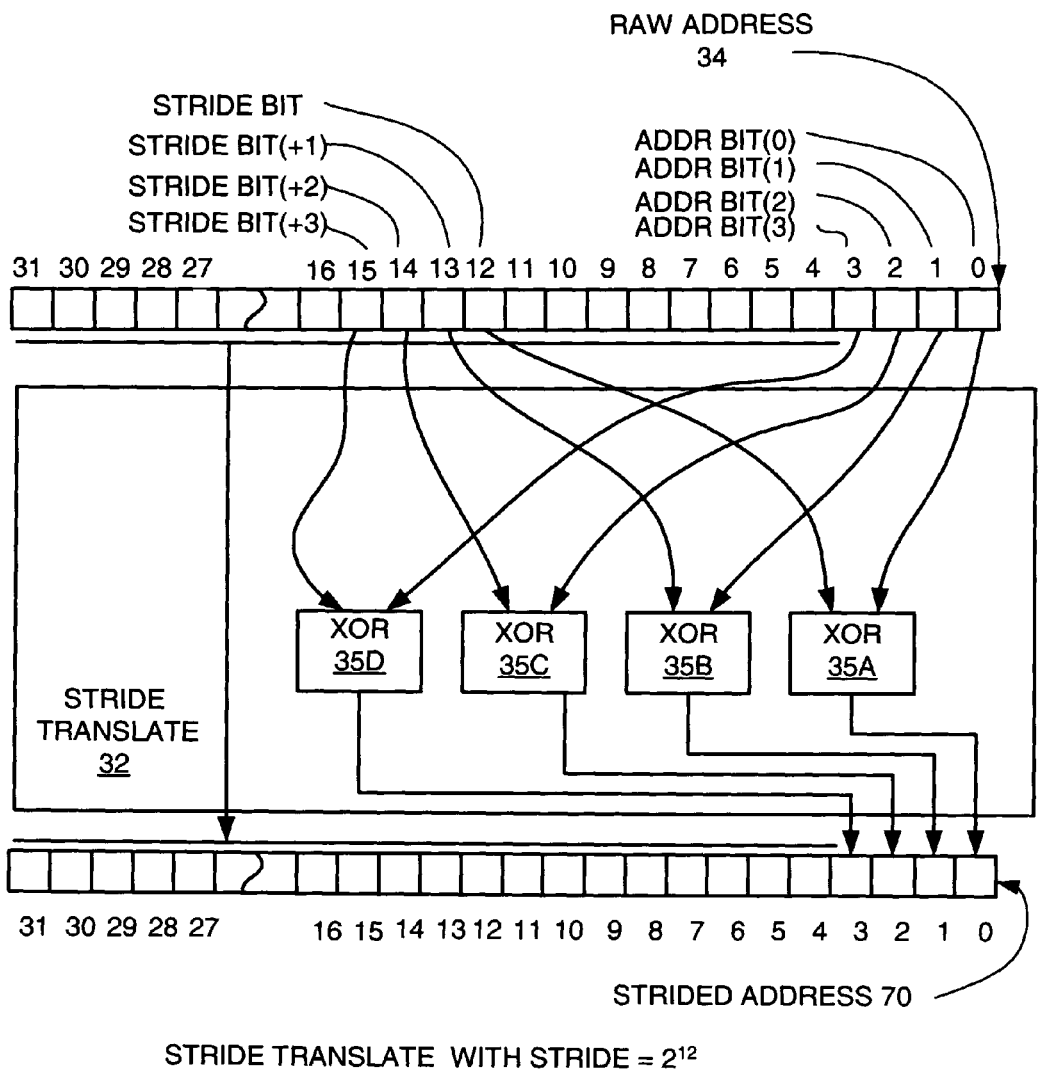
FIG. 6A shows an exemplary stride translate that translates a raw address to a strided address if an intended stride is $2^{12}$.

FIG. 6A shows a simplified embodiment of stride translate 32. Stride translate 32 shown in FIG. 6A is useful only for a stride value of $2^{12}$, and will be used as for explanation of how a strided address 70 can be produced. A generalized, programmable stride translate 32 embodiment will be shown in more detail shortly with reference to FIGS. 7A-7C.

Raw address 34, in FIG. 6A, is shown as a 32 bit address. For exemplary purposes, it is assumed that bits 0-1 designate which of four groups the address would point to, if not translated by stride translator 32. For exemplary purposes, it is further assumed that bits 2-3 designate which of four banks within the selected group that the address would point to, if not translated by stride translator 32. These assumptions are as described in the discussion of FIGS. 4A-4C. Stride translate 32 overcomes the problems described in the discussion of FIGS. 4A-4C when stride control 21 is active. Stride translate 32 in FIG. 6A-6C assumes, for simplicity, that stride control 21 is active.

Raw address 34, bits 4-31 are transferred unchanged to strided address 70, bits 4-31 by stride translate 32.

Raw address 34, bits 0-3 are exclusive OR'ed (XORed) with raw address 34, bits 12-15, respectively, by XORs 35A-35D as shown, which produce strided address 70, bits 0-3. Recall that the stride value is $2^{12}$.

During a sequential write, as shown in FIG. 6B, raw address 34 will be incremented; that is, least significant bit, raw address 34 simply counts up in a binary fashion. It will be noted that, as raw address 34 is incremented, the least significant bits of strided address 70 may or may not increment in a binary count, depending on the values of raw address 34, bits 12-15. When raw address 34, bits 12-15, are "0000", strided address 70, bits 0-3 will be the same as raw address 34, bits 0-3. Different values of raw address 34, bits 12-15 will cause different translations of raw address 34, bits 0-3 to strided address 70, bits 0-3. However, each value of raw address 34 has a one to one translation into a unique corresponding address value in strided address 70.

FIG. 6B shows portions of a sequential write addressing sequence—a write of a first $2^{12}$ data elements, and, continuing, a write of the next $2^{12}$ data elements of data being written into a memory portion. For simplicity, only raw address 34, bits 0-3, raw address 34, bits 12-15, strided address 70, bits 0-3, and strided address 70, bits 12-15 are shown. Note that, for the first $2^{12}$ data elements, with raw address 34, bits 12-15 being all "0", strided address 70 is the same as raw address 34. In the second $2^{12}$ data element write, with raw address 34, bit 12 being "1", strided address 70 does not count in a simple binary fashion because of the hashing performed by XORs 35A-35D. As additional "1"s appear in raw address 34, bits 12-15, the hashing produced by XORs 35A-35D produce different count sequences in strided address 70, bits 0-3. It will be noted, that, regardless of the bit pattern in raw address 34, bits 12-15, that different groups will be sequentially accessed during the sequential write of a set of data elements.

Continuing with the example of FIG. 6A, during a read with stride $2^{12}$, as shown in FIG. 6C, raw address 34 will increment by $2^{12}$. That is, the stride bit (bit 12) will toggle for each successive data element during a read with stride $2^{12}$; stride bit(+1) (i.e., raw address 34, bit 13) will toggle every two data element accesses (i.e., will be "0" for two successive access, then "1" for two successive accesses); stride bit(+2) will toggle every four data element accesses (i.e., will be "0" for four data element accesses, then will be "1" for four data element accesses), and stride bit(+3) will toggle for every eight data element accesses. During such strided reads, addr bits 0-3 will not be changing frequently. For example, in a large matrix, the first data element is read, followed by the $2^{12th}$ data element, and so on during a first strided set of reads through the memory portion. A strided pass through a memory portion is called a sweep. In the current example of FIG. 6A, every $2^{12th}$ data element is read. In a second sweep, the addressing begins with the second data element in the raw address, i.e., "00000001" in hexadecimal, and continues, striding, reading every $2^{12th}$ data element. FIG. 6C shows raw address 34, bits 12-15 and 0-3, and strided address 70, bits 12-15 and 0-3 for portions of the first sweep and the second sweep. Note that in both the first sweep and in the second sweep, the group changes for each successive read of a data element. This is in contrast with the example of FIG. 4C where exactly the same group and bank were accessed on successive strided reads of data elements.

It will be appreciated that stride translate 32 data elements can also be written at the stride $2^{12}$ and read subsequently read either sequentially or at the stride $2^{12}$ without consecutively accessing the same bank in a particular group. The sequential write followed by a strided read as described above was used for explanation and is not to be taken as a requirement for a sequential write followed by a strided read.

Stride translate 32 of FIG. 6A is simplified for understanding of the group and bank hashing operation that is performed when stride control 21 of control packet 20 is active. It will be understood that stride translate 32, in an embodiment, directly sends bits 0-3 of raw address 34 to bits 0-3 of strided address 70 when stride control 21 of control packet 20 is inactive.

Figure 7A:
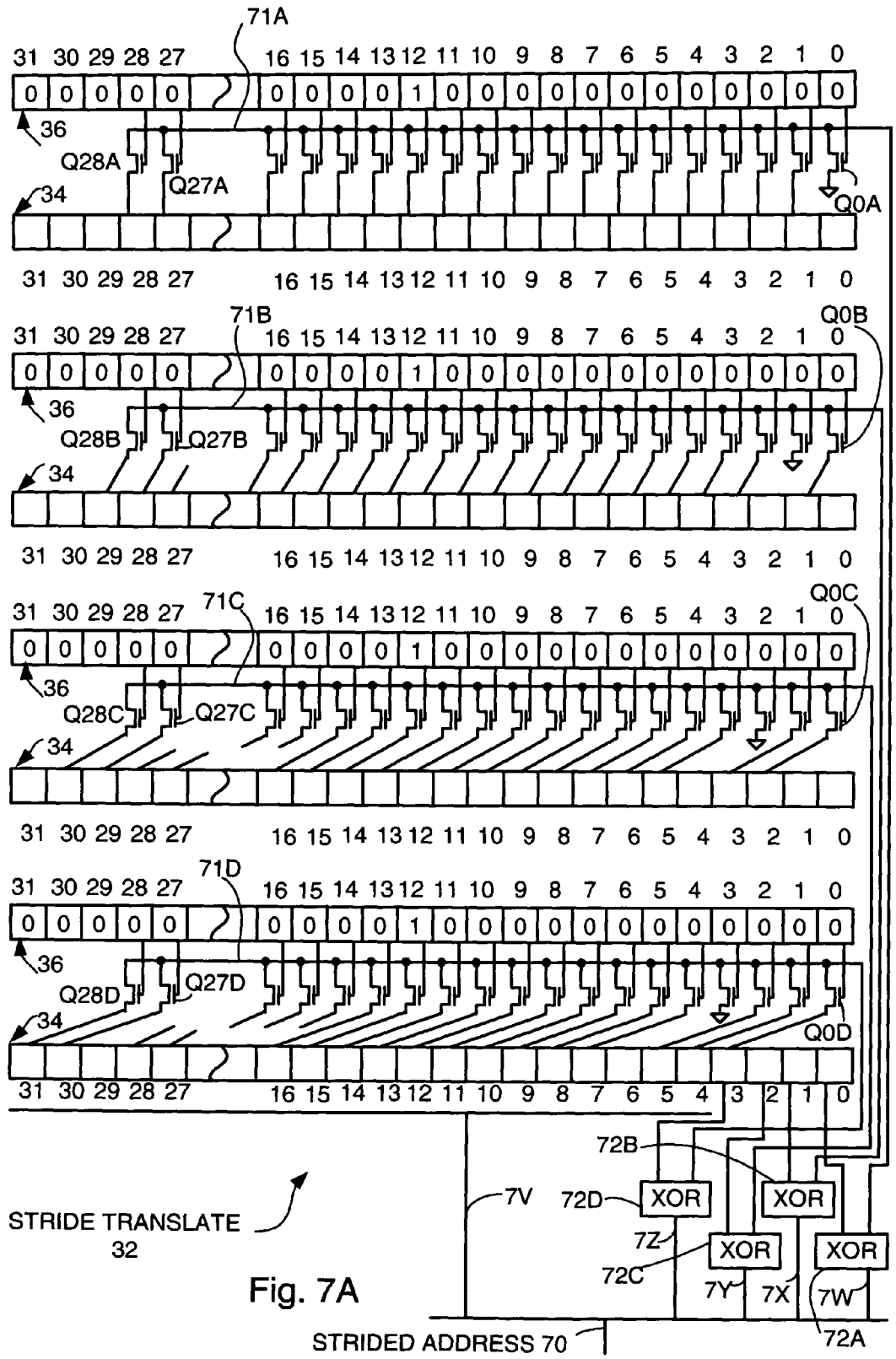
FIG. 7A shows an exemplary programmable stride translate that translates a raw address to a strided address.

FIG. 7A shows a generalized embodiment of stride translate 32. Raw address 34 is shown repeated several times for clarity. Multiple physical copies of raw address 34 are implemented in various embodiments for circuit reasons, although a single physical copy of raw address 34 is logically sufficient and will suffice electrically in typical implementations.

A stride register 36 contains all zeroes except for the stride bit. The stride bit, in an embodiment, is set using the value of stride 24 of control packet 20. In another embodiment, stride 24 is physically used as stride register 36, which is possible as long as there are sufficient bits in stride 24, a "1" is written in the stride bit, and the remainder of stride 24 is all "0". As with raw address 34, stride register 36 is shown repeated four times for clarity. Although multiple copies of stride register 36 are contemplated, typically, a single copy of stride register 36 suffices logically and electrically.

Stride register 36 is shown for exemplary purposes as having a "1" in bit 12, in order to continue using the example of FIG. 6A-6B, where the intended read stride is $2^{12}$. Stride register 36, however, supports any stride of $2^N$ consistent with the 31 bit address assumed for explanation.

Q0A-Q28A are switches (N-channel FETs are shown as the switches in FIG. 7A) that pass a bit, selected by the "1" bit in stride register 36, from raw address 34 to an exclusive OR 72A on signal 71A. In FIG. 7A, with a "1" in position 12 of stride register 36, bit 12 of raw address 34 is coupled to a first input of XOR 72A, a second input of XOR 72A is coupled to bit 0 of raw address 34. XOR 72A outputs a signal on a portion of strided address 70, signal line 7W, that is bit 0 of strided address 70. Similarly, switches Q0B-Q28B couple a bit from raw address 34 to a first input of exclusive OR gate 72B on signal 71B, under control of the "1" value in stride register 36. Note that the bit position of raw address 34 that is coupled is the stride bit plus one, that is, bit 13 of raw address 34. A second input of XOR 72B is coupled to raw address 34, bit 1. XOR 72B produces bit 1 of strided address 70, on signal line 7X. In a similar manner, switches Q0C-Q28C, and Q0D-Q28D couple stride bit plus two bit positions and stride bit plus three bit positions, on signals 71C and 71D, to XORs 72C and 72D, respectively. XORs 72C and 72D outputs are coupled to signal lines 7Y and 7Z, which are bit 2 and bit 3, respectively, of strided address 70.

A particular bit must not be exclusive OR'ed with itself; doing so would destroy a unique one-to-one addressing relationship. Therefore, Q0A is shown as a switch that, when selected (i.e., with bit 0 of stride register 36 being "1"), simply outputs a "0" (as shown with N channel FET Q0A, a source of Q0A is coupled to ground). The first exclusive OR then always simply places a current value of bit 0 of raw address 34 on signal line 7W, which is 0 of strided address 70. Similarly, the appropriate switches in Q0B-Q28B, Q0C-Q28C, and Q0D-Q28D output "0" dependent on their respective control bits in stride register 36 to ensure that no bit in raw address 34 is exclusive OR'ed with itself. A stride that causes such avoidance of XORing of a particular bit with itself disables the hashing for that bit and would degrade performance. However, it is extremely unlikely that such an avoidance would happen, since strides are typically long enough that interference of a stride bit with a group ID or bank ID portion of an address would not happen.

It will be appreciated that stride translate 32 shown in FIG. 7A is but one embodiment of stride translate 32. Other embodiments are contemplated. For example (not shown), a plurality of four bit selectors enabled by the stride value on stride value bus 33 (see FIG. 5) that select appropriate bits in raw address 34 to XOR with the group ID bits and bank ID bits would be a suitable alternative.

Stride translate 32 as shown in FIG. 7A will always perform a hash (an exclusive or combination) of the bank and group IDs (shown for exemplary purposes as raw address 34, bits 2-3, and bits 0-1, respectively) with a stride bit field that is controlled, as explained above, by a "1" being placed by application 12 (FIG. 1) in a bit position in stride register 36, the remainder of stride register 36 containing "0"s. Some applications may require that the raw address, held in raw address 34, be used directly; that is, without any hashing being performed. As shown in the embodiment of stride translate 32 in FIG. 7A, one and only one bit in stride register 36 must be "1". If all bits in stride register 34 are "0", signal lines 71A-71 D will "float", and will have indeterminate voltage values, which cannot be allowed.

Embodiments of stride translate 32 provide for a direct use of raw address 34. FIG. 7B shows an embodiment of stride translate 32 that provides for the raw address 34 being directly used in strided address 70. For simplicity, only a portion of stride translate 32 of FIG. 7A is shown, in order to clearly describe the additional circuitry needed to cause raw address 34 to be passed to strided address 70 without translation. In the embodiment of FIG. 7B, all bits in stride register 36 are set to "0" (not shown in FIG. 7B). Stride control 21 (introduced in FIG. 2) is set to "0", meaning that strides are not to be used, and no hashing is to be performed by stride translate 32. Inverter 72 produces a "1" on signal 73 when stride control 21 is set to "0". A "1" on signal 73 turns on switches QA, QB, QC, and QD, shown as N-channel FETs in FIG. 7B. Signals 71A-71D are pulled to "0" by switches QA, QB, QC, and QD when signal 73 is "1". As shown in FIG. 7A, signals 71A-71D are coupled to first inputs on XORs 72A-72D. Second inputs on XORs 72A-72D are coupled to bits 0-3, respectively, of raw address 34. When signals 71A-71D are "0", XORs 72A-72D logically pass raw address bits 0-3 directly, therefore making strided address 70 the same value as raw address 34.

FIG. 7C shows another embodiment of stride translate 32 that provides for directly using a value in raw address 34 as the value of strided address 70. As with FIG. 7B, FIG. 7C is a variant of FIG. 7A and only a portion of stride translate 32 of FIG. 7A is shown, in order to clearly describe the additional circuitry. As above, when a direct use of raw address 34 for strided address 70 is desired, stride control 21 is set to "0" by application 12. The value of stride control 21 is coupled to ANDs 74A-74D. ANDs 74A-74D output "0" when stride control 21 outputs a "0" on signal 75. XOR circuits 72A-72D simply pass the values of raw address bits 0-3 onto signals 7W-7Z when ANDs 74A-74D output "0"s. As explained above, 7W-7Z are bits 0-3 of strided address 70.

The stride translate scheme illustrated in 7A-7C is exemplary only. It will be appreciated that any logic that hashes one or more bits associated with a stride value stride in a raw address with one or more bits in the raw address that identify group and/or bank selection and outputs a strided address is within the spirit and scope of the present invention.

Figure 8A:
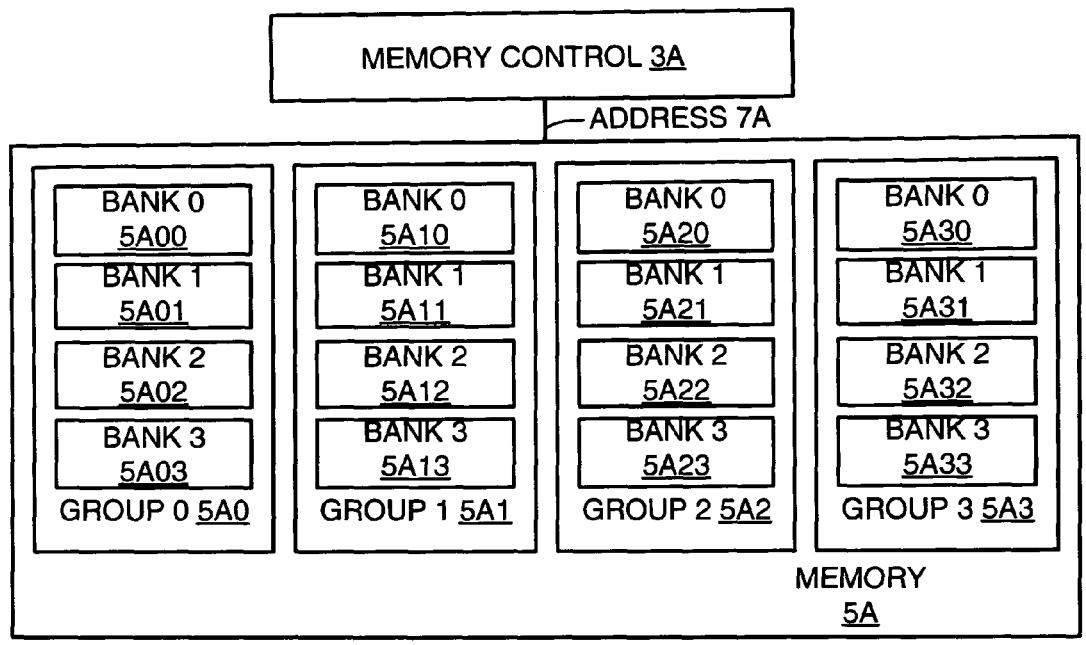
FIG. 8A is a block diagram illustrating a memory system having four groups, each group having four banks. A single address couples a memory control to the memory.

FIG. 8A shows a memory control 3A embodiment of memory control 3 (FIG. 1). Memory control 3A outputs a strided address value on address bus 7A. The strided address is sent to groups 0-3 (reference numbered 5A0-5A3) of memory 5A. Each group is shown having four banks, bank 0-3. Banks 0-3 are respectively reference numbered as 5A00-5A03 in group 0; 5A10-5A13 in group 1, and so on. Memory 5A is an embodiment of memory 5 (FIG. 1). Because there is a single address bus (7A) only a single group can be addressed at a given time with a request. With bank hashing (i.e., sequential reads or writes are not directed to the same bank), successive reads or writes to the banks within a group can be done in quick succession. Recall that, as explained earlier with reference to FIGS. 4A-4C, without hashing, the same bank in the same group is repeatedly accessed during a strided access. Typical recovery of a particular bank in current technology is on the order of 60 nanoseconds before the same bank can be accessed again, resulting is very slow performance of computer system 1 if the same bank in the same group is repeatedly accessed.

Figure 8B:
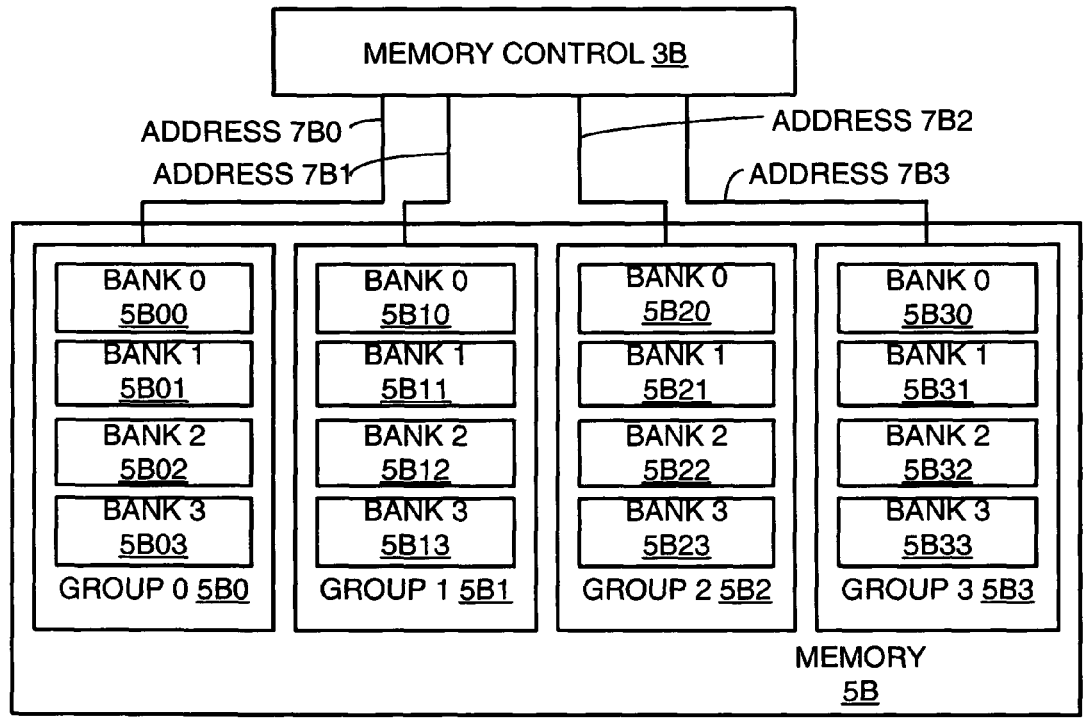
FIG. 8B is a block diagram illustrating a memory system having four groups, each group having four banks. Each group is coupled to the memory control with a separate address.

FIG. 8B shows an embodiment, memory control 3B, of memory control 3. Memory control 3B is coupled to memory 5B, an embodiment of memory 5, using four address busses, address busses 7B0-7B3. Memory 5B comprises four groups, groups 0-3, reference numbered 5B0-5B3. Each group further comprises four banks, reference numbered 5B00-5B03 in group 0; 5B10-5B13 in group 2; 5B20-5B23 in group 3; and 5B30-5B33 in group 3. Each of address busses 7B0-7B3 is independent of the other. In fact, with hashing as explained above, ensuring that four consecutive accesses (either sequential or at the intended stride) go to different groups, all groups can be accessed at the same time. Furthermore, with bank hashing, as explained above, not only can the four groups be accessed at the same time, but they can be accessed four times without waiting for bank recovery (unless bank recovery is more than four times the access time of a bank), since a different bank in each group will be accessed on each consecutive access.

Figure 8C:
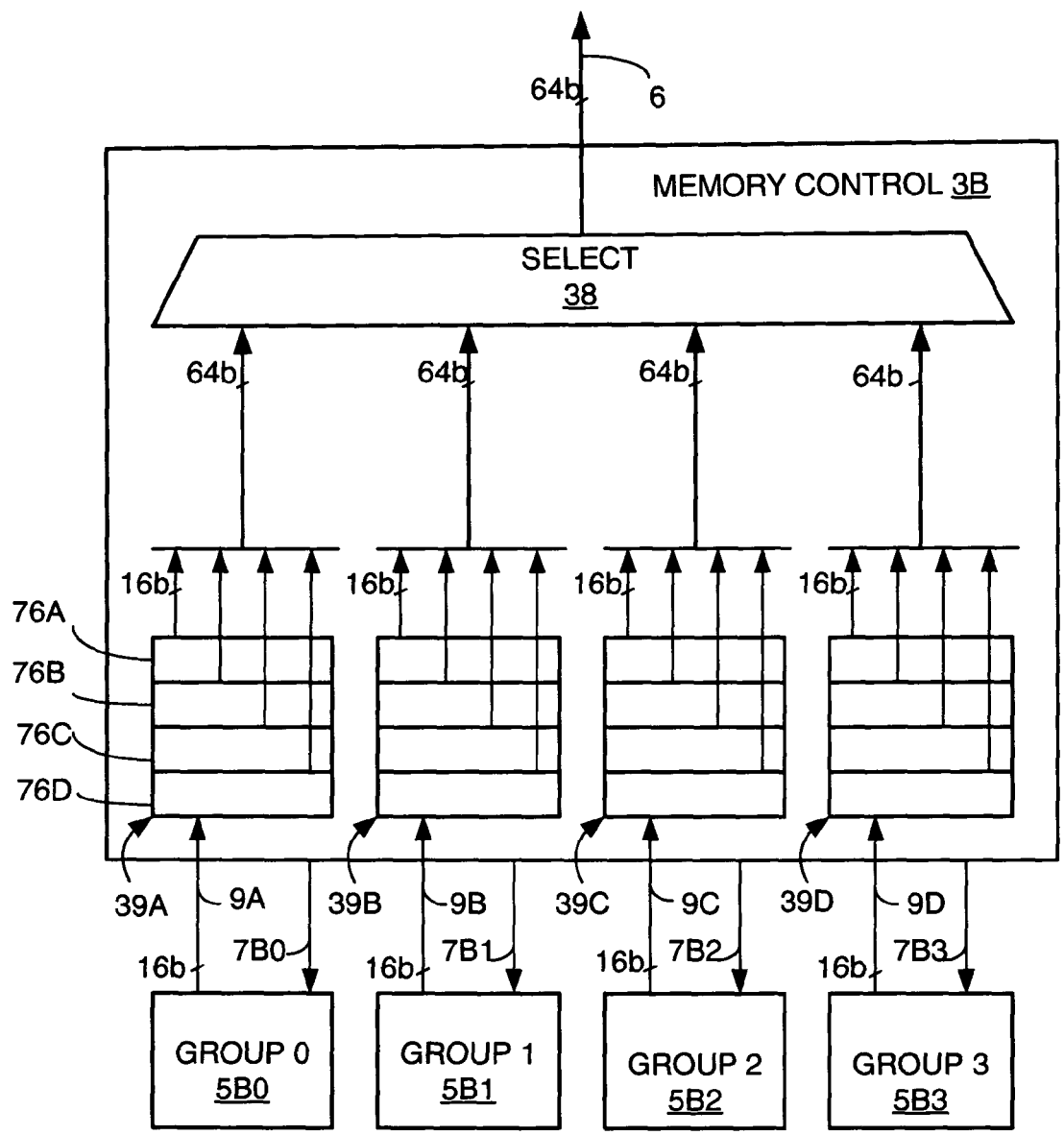
FIG. 8C is a block diagram showing a memory control coupled to a memory having four groups as shown in FIG. 8B, including details on how the memory control accommodates current SDRAMs (synchronous dynamic random access memories).

FIG. 8C shows memory control 3B of FIG. 8B in more detail. Groups 0-3 (5B0-5B3) are as shown in FIG. 8B. Current SDRAMs have 16 bit data busses (data busses 9A-9D in FIG. 8C). For a particular group to output 8 bytes, four beats of data on the data bus (i.e., 9A, 9B, 9C or 9D) coupling that group to memory control are required. To accommodate these narrow data busses, an embodiment of memory control 3B has four 16 bit registers per group. Register sets 39A, 39B, 39C, 39D each have four 16 bit registers (the four 16 bit registers for register set 39A are identified as 76A-76D) to store data from group 0-3 respectively. Each register set outputs eight bytes of data (64 bits). Select 38 then selects which register set is coupled to processor data bus 6 at a given time. The above description details how data is read from the SDRAMs. It will be understood that a similar process is used to write data either sequentially, or at the intended stride.

FIG. 8D is a table giving exemplary bandwidths for cases with various group and bank hashing embodiments using sequential accesses or accesses at the intended stride. A 60 ns (nanosecond) bank refresh time is assumed.

In the first row of the table of FIG. 8D, no group hashing and no bank hashing is enabled. In this mode, it is possible that the same bank in the same group is accessed on strided accesses, and therefore, the bandwidth is limited to 8 bytes every 60 ns (nanoseconds), or 133 MB/second (megabytes/second).

In the second row of the table of FIG. 8D, group hashing is assumed, but not bank hashing. In this mode, accesses during a sweep at the intended stride, strided addresses are guaranteed to access different groups, but may repeatedly access the same bank number. Therefore, memory control 3B and memory 5B can transfer 8 bytes from each of the four groups every 60 ns, for a striding bandwidth of 533 MB/second.

In the third row of the table of FIG. 8D, group hashing is not assumed, but bank hashing is assumed. In this mode, access during a sweep at the intended, the same group may be accessed repeatedly, but it is guaranteed that successive accesses will access different banks within the group. Therefore, memory control 3B and memory 5B can transfer 8 bytes from the selected group every 60 ns, for a striding bandwidth of 533 MB/second.

In the fourth row of the table of FIG. 8D, both group hashing and bank hashing are assumed. Using the four group, four bank/group exemplary memory of 5B, memory control 3B can, during a sweep at the intended stride, or during sequential reads or writes, access all four groups (groups 0-3) in parallel, and, because subsequent accesses to the four groups in parallel will not access the same banks in the groups, four of the parallel group accesses can be done in the 60 ns bank refresh times. In other words when reading at the intended stride, or reading/writing sequentially, each of the four groups can deliver four eight byte data transfers in 60 ns, resulting in a 2.133 GB/second (gigabyte/second) data transfer from memory 5B to memory control 3B.

Figure 9A:
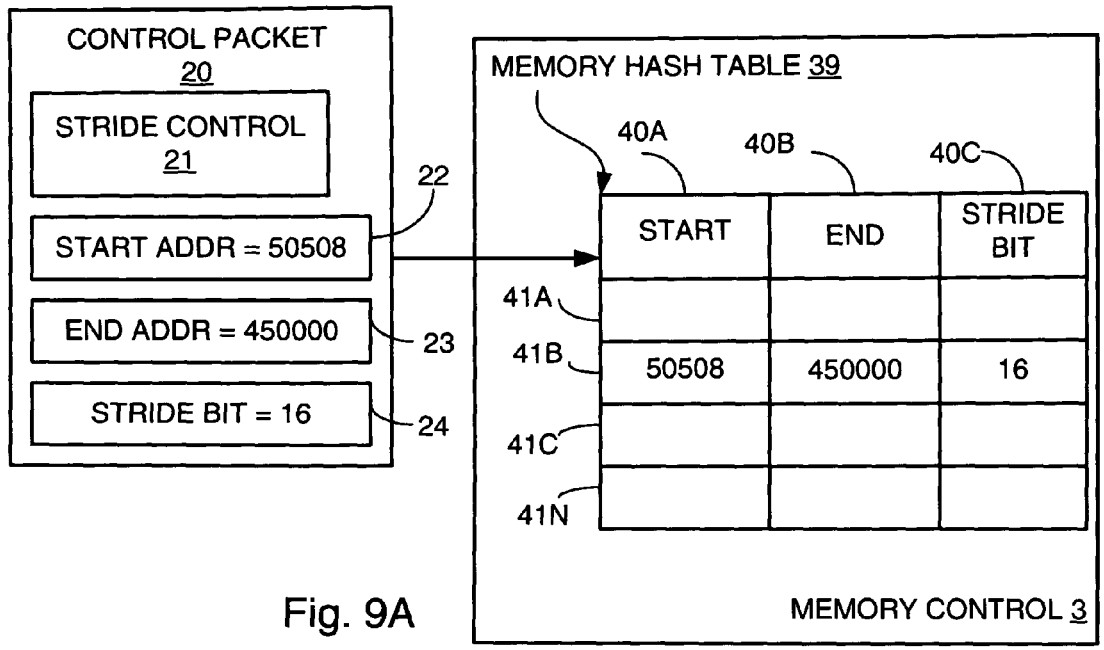
FIG. 9A shows how a optional memory hash table in a memory control is written using data from a control packet.

FIGS. 9A-9D show an embodiment of memory control 3 having a memory hash table 39. Memory hash table 39 is implemented in an embodiment of memory control 3. If memory hash table 39 is not implemented, application 12 (see FIG. 1) must provide control packet 20 with each request for reading or writing data into memory 3. In an embodiment including memory hash table 39, required information for memory portions (e.g., memory portions 16A, 16B, and 16C of FIG. 3A) is retained in memory hash table 39 in memory controller 3. As shown in FIG. 9A, memory hash table 39 has a number of rows 41A-41N and a number of columns 40A-40C. Each row in memory hash table 39 contains a starting address, an ending address and a stride value for a particular memory portion. Enough rows are supplied to support a maximum number of memory portions required. If application 12 has filled all rows in memory hash table 39, either further memory portions have to be supported by sending a control packet 20 for each request, or else memory control 3 simply would not use group and bit hashing for such "overflow" memory portions.

In the example in FIG. 9A, when data is written into a particular memory portion, control packet 20 is sent by application 12 to memory control 3. Stride value 24 is shown having the stride bit being 16 (i.e., the preferred stride is $2^{16}$) for the instant memory portion. Stride value 24 is stored in column 40C in row 41B, the row used for the instant memory portion. Start address 22 is 50508 (in hexadecimal) and is stored in column 40A of the row used for the instant memory portion (row 41B in FIG. 9A). Similarly, end address 23 is 450000 (in hexadecimal) is stored in column 40B in row 41B. In an embodiment, stride control is stored in another column of memory hash table 39 (not shown). However, advantageously, in an embodiment, if stride control is inactive, the value of the instance of stride bit in column 40C is simply set to "0".

In an embodiment having memory hash table 39, application 12 need only send a control packet 20 once to memory control 3. When further memory requests are made, memory hash table 39 is referenced for an address range of the memory portion, whether stride control is active for that memory portion, and, if so, what the specified stride for that memory portion is.

Figure 9B:
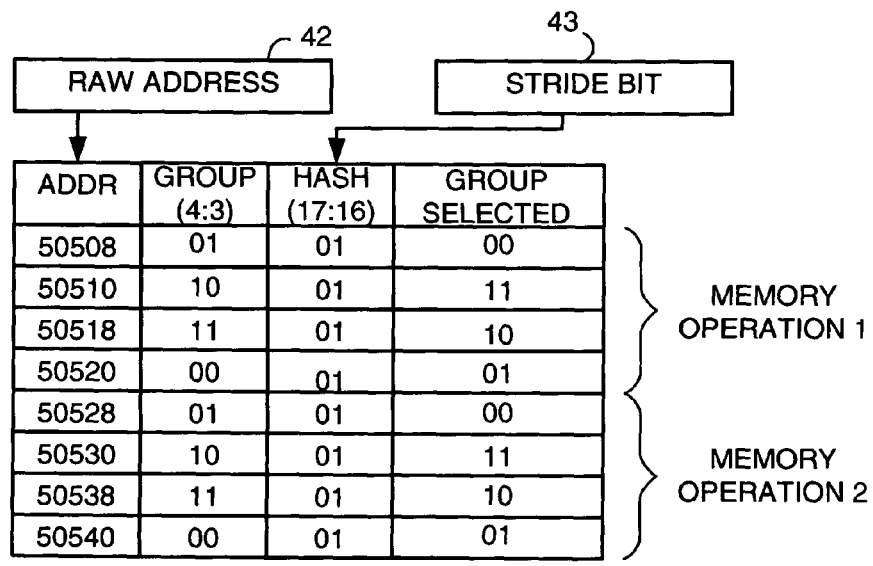
FIG. 9B shows an example of sequential data being written to a memory with intent to read using a $2^{16}$ stride.

FIG. 9B gives an example of sequentially writing data into the memory portion referenced by row 41B of FIG. 9A. The example of FIG. 9B assumes group hashing, but not bank hashing. Addresses are in hexadecimal. Raw address 42 is similar to raw address 34, but bits 3-4 of raw address 42 are used to identify the group. Stride bit 43 is taken from column 40C of row 41B for addresses within the address range of the memory portion in the example of FIG. 9B. Each address accesses eight bytes of data. During the sequential writes shown in FIG. 9B, addresses increase by eight bytes per access. Group (4:3) shows how raw address 42, bits 3-4, change as raw address 42 is incremented by eight, as eight bytes are written/read per access. Stride bit 43 contains "16" (i.e., in an embodiment of memory control 3 similar to that shown in FIGS. 7A-7C, stride register 36 contains a "1" in bit 16). The two group bits 3 and 4 are XOR'ed (hashed) with raw address bits 16 and 17. The group selected is seen to not access the same group until the fifth access. Assuming a memory control 3B and a memory 5B (i.e., independent address bus to each of four groups), four accesses can be made in parallel, as identified by memory operation 1 and memory operation 2 in FIG. 9B. Note that bank hashing can also be done, as explained earlier, to further enhance the amount of data transferred in a given time. Bank hashing was explained earlier and has been not used in FIG. 9B-9D for simplicity.

Figure 9C:
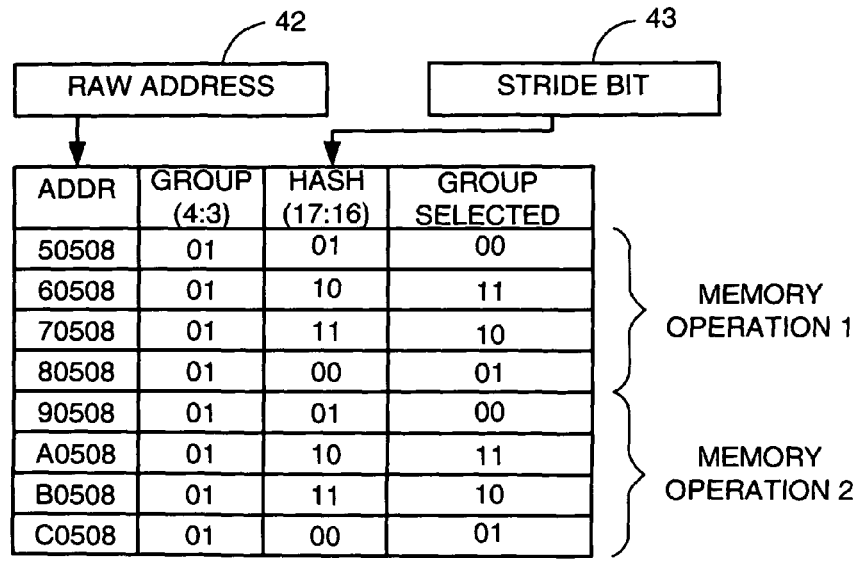
FIG. 9C shows a read of the data written in FIG. 9B, using a $2^{16}$ stride.

FIG. 9C shows reads of the memory portion having the address range of row 41B of FIG. 9A. Successive addresses are $2^{16}$ apart (i.e., the stride for the instant memory portion). Hash bits (i.e., bits 16 and 17) increment in a straight binary fashion. Hashing bits 16 and 17 with group bits 3 and 4 result in the group selected as shown in FIG. 9C. Note that the same group is only accessed every fifth access, allowing, as in the sequential write shown in FIG. 9B, four reads to be performed at the same time, using an embodiment similar to memory control 3B and memory 5B.

Figure 9D:
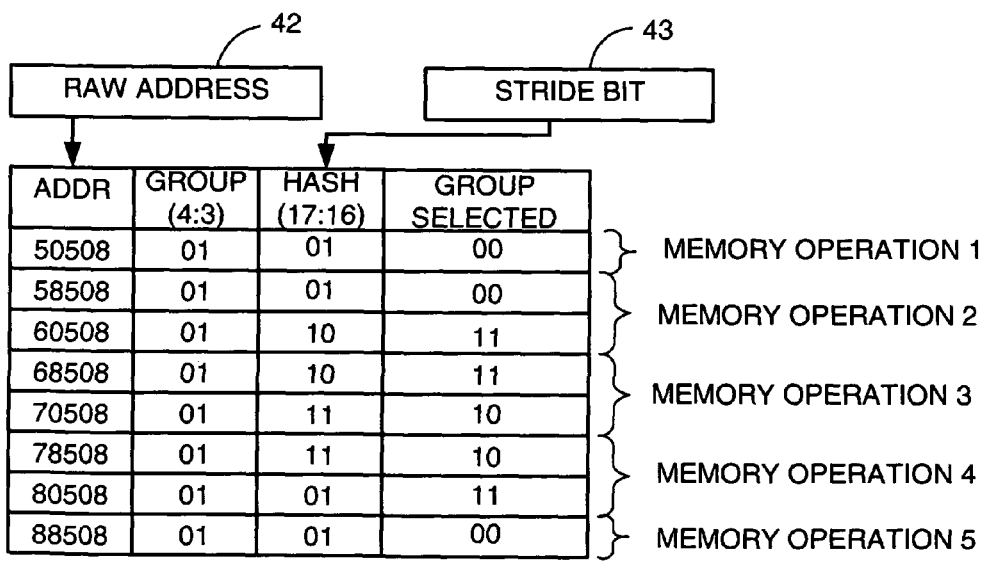
FIG. 9D shows a read of the data written in FIG. 9B, using a $2^{15}$ stride.

FIG. 9D shows that a memory portion can be accessed at other than the stride specified. Correct data is returned to memory control 3 from memory 5; however, at a lower number of bytes/second, since the same group is accessed frequently.

Figure 10:
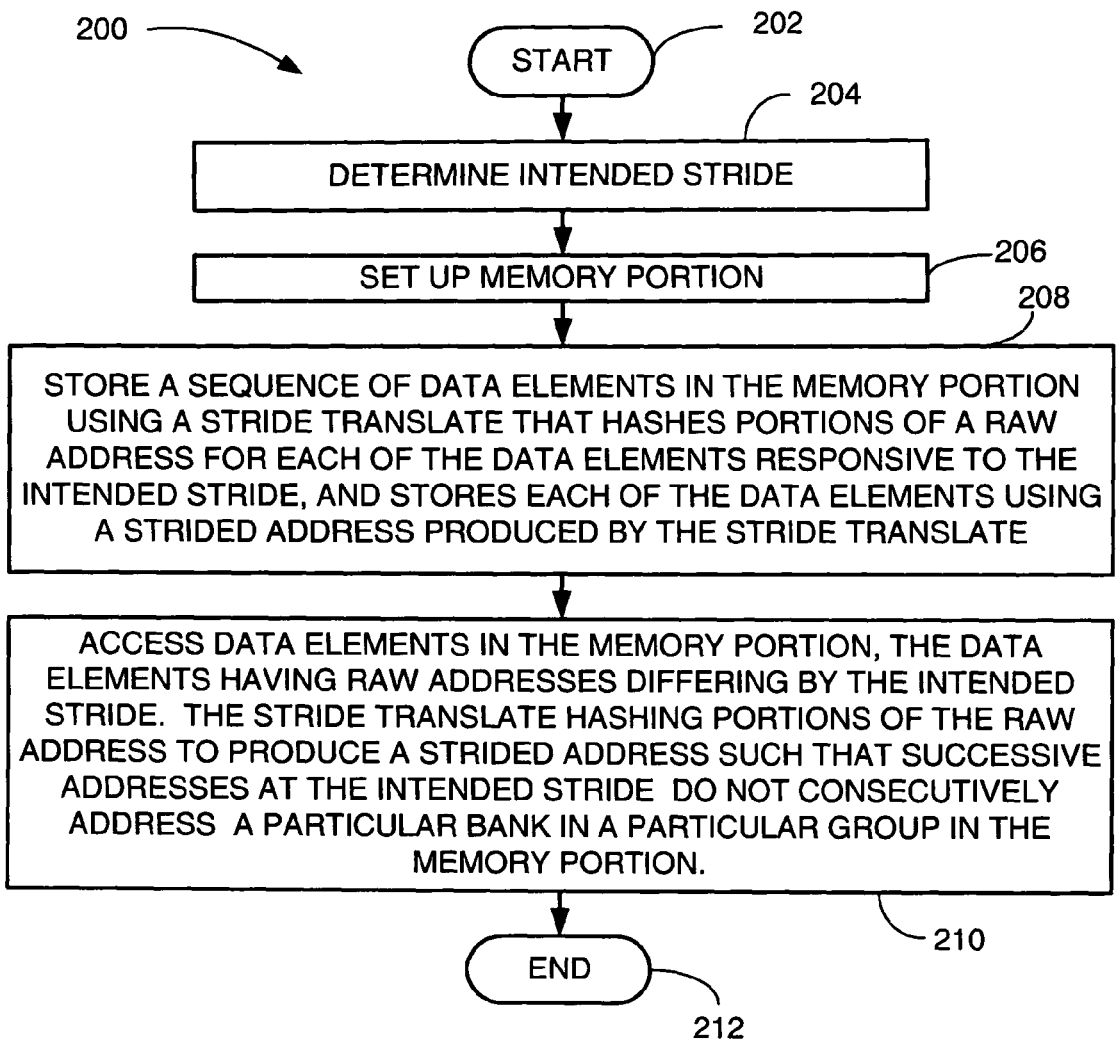
FIG. 10 shows a flow diagram of a method embodiment of the invention.

FIG. 10 shows a flow chart of method 200. Step 202 begins the method. In step 204, an application running in a processor determines an intended stride. For example, the application may be a scientific program running on the processor. The application may have read in a large number of data elements from sensors, for example, such data elements may represent temperature, geometric coordinates, velocities of an object, and so on. Many scientific programs perform matrix mathematics and, knowing the particulars of the matrix mathematics to be performed, and the size of the matrix (i.e., number of columns and rows, in a two-dimensional matrix) know what the intended stride will be when reading data elements from memory. For example, in a 4,096×4,096 matrix, a particular matrix mathematics program may need to read every $4,096^{th}$ data element. Therefore, the application "knows" the size of the matrix required and what the intended stride is when accessing the data elements. Typically, however, when the data elements are written into a memory, the data elements are sent to a memory control using sequential raw memory addresses, or data is sent to the memory control, while the memory control sequentially increments a raw memory address.

In step 206, the application running in the processor sets up a memory portion in the memory to hold the data elements described above. An intended stride is sent to the memory control, along with information to specify the memory portion, such as a starting address in memory for the memory portion and an ending address in memory for the memory portion. In addition, a stride control is sent, indicating whether striding is to be performed at all in the memory portion.

In step 208, the data elements are sent to a memory control, which, if the stride control is active, uses the intended stride to hash portions of the raw address, for each data element, responsive to the intended stride and produces a strided address having a subset of bits produced by the hashing, with the remainder of bits in the strided address being the same as the corresponding bits in the raw address. Consecutive data elements will not be written to a same particular bank in the memory.

In step 210, data elements in the memory portion are accessed at the intended stride. Successive raw addresses (sent by the application or generated by the memory control) differ, during each sweep through the memory portion, by the intended stride. Portions of the raw address are hashed, producing a subset of bits in the strided address. The remainder of the bits in the strided address is the corresponding bits in the raw address. Consecutive data elements accessed at the preferred stride or sequentially accessed will not be at the same particular bank in the memory.

In a computer system having a plurality of groups in memory, each group having a plurality of banks, the hashing provides a strided address that, when the raw address is incremented by data element or by the intended stride, consecutive accesses do not go to the same group, therefore allowing the memory control to access multiple groups at the same time. Advantageously, the strided address in such a computer system also distributes access between banks within the groups such that different banks will be accessed, in turn, during the incrementing of the raw address by data element or at the intended stride.

Step 212 completes the method.

What is claimed is:

1. A computer system comprising:
a processor;
a memory control coupled to the processor;
a memory coupled to the memory control, the memory further comprising one or more groups, each group further comprising one or more banks;
a first memory portion resident in the memory; and
an application executing in the processor;
wherein the application provides the memory control with information, prior to writing a first data element in the first memory portion, about the first memory portion in the memory, including an intended stride for data elements in the first memory portion, the memory control using the intended stride when writing the data elements at a first stride, the first stride not the same as the intended stride, to distribute the data elements among the one or more groups and the one or more banks in the one or more groups in the first memory portion in such a way that a subsequent strided access at the intended stride does not consecutively access a particular bank in a particular group; and wherein the first memory portion comprises more than one data element; and wherein a subsequent access, at the first stride, of the data elements written to the first memory portion does not consecutively access a particular bank in a particular group; and wherein reordering of accesses is not performed.

2. The computer system of claim 1, wherein the application provides the memory control with information about a second memory portion in the memory, including an intended stride for data elements in the second memory portion, the memory control, prior to writing a first data element in the second memory portion, using the intended stride for data elements in the second memory portion when writing the data elements at a second stride, the second stride not the same as the intended stride for data elements in the second memory portion, to the second memory portion among one or more groups in the second memory portion in such a way that a subsequent strided access at the intended stride for the data elements in the second memory portion does not consecutively access a particular bank in a particular group in the second memory portion; and wherein the data elements in the second memory portion include more than one data element; and wherein the data elements written to the second memory portion are accessed at the second stride without consecutively accessing a particular bank in a particular group in the second memory.

3. The computer system of claim 2, wherein the second memory portion contains a different number of bytes than the first memory portion.

4. The computer system of claim 2, wherein the intended stride for the second memory portion is not the same as the intended stride for the first memory portion.

5. The computer system of claim 1, the memory control further comprising a stride translate capable of hashing one or more first bits in a raw address selected using the intended stride with one or more second bits in the raw address to produce one or more third bits.

6. The computer system of claim 5, further comprising a strided address comprising the third bits in the same bit positions of the strided address as the second bits of the raw address, the remaining bits in the strided address being the same bits as the corresponding bit positions in the raw address.

7. The computer system of claim 6, the one or more second bits in the raw address comprising one or more group identification bits.

8. The computer system of claim 6, the one or more second bits in the raw address comprising one or more bank identification bits.

9. The computer system of claim 6, the one or more second bits in the raw address comprising both one or more group identification bits and one or more bank identification bits.

10. The computer system of claim 6, wherein hashing one or more first bits in the raw address with one or more second bits in the raw address is performed by exclusive OR'ing each bit in the first bits with a bit in the second bits.

11. The computer system of claim 1, wherein the information about the first memory portion comprises an intended stride value and a starting address of the first memory portion.

12. The computer system of claim 11, wherein the information about the first memory portion further comprises an ending address of the first memory portion.

13. The computer system of claim 11, wherein the information about the first memory portion further comprises a length of the first memory portion.

14. The computer system of claim 11, wherein the information about the first memory portion further comprises a stride control that indicates whether the raw address value is to be used without hashing for addressing the first memory portion.

15. The computer system of claim 1, further comprising a second memory portion.

16. The computer system of claim 15, the second memory portion being noncontiguous with the first memory portion.

17. The computer system of claim 15, the second memory portion having a different number of bytes than the first memory portion.

18. The computer system of claim 15, the second memory portion having a different intended stride than the first memory portion.

19. The computer system of claim 5, further comprising a memory hash table capable of storing the information about the first memory portion in the memory, wherein at least a portion of the information determines selection of the one or more first bits in the raw address.

20. The computer system of claim 19, wherein the memory control uses the information about the first memory portion stored in the memory hash table during an access of a data element in the first memory portion.

21. A method for sequentially accessing data elements or accessing data elements at an intended stride in a memory portion in a memory, the intended stride not being the same as sequentially accessing the data elements, the memory having one or more groups, each group having one or more banks, in a computer system comprising the steps of:

determining, by an application program, an intended stride for accessing data elements in the memory portion;

setting up, by the application program, the memory portion by defining a starting address of the memory portion and an ending address of the memory portion;

sequentially writing data elements into the memory portion, using the intended stride to distribute the data elements among the one or more groups and the one or more banks in such a way that the same bank is not written to in immediate succession; and subsequently accessing data elements at the intended stride, with no two accesses consecutively being to the same bank and with no reordering of accesses being performed.

22. The method of claim 21, further comprising the steps of:

hashing one or more first bits in a raw address determined by the intended stride with one or more second bits in the raw address used to identify a bank and/or a group, the hashing producing a set of third bits;

producing a strided address using the third bits produced by the hashing to identify the bank and/or the group.

23. The method of claim 22, further comprising the step of using corresponding bits in the raw address for bits in the strided address, except that the third bits are used in the strided address in the corresponding bit positions of the second bits of the raw address.

* * * * *